(12) United States Patent
Vaidyanathan et al.

(10) Patent No.: US 8,886,485 B2
(45) Date of Patent: Nov. 11, 2014

(54) METHOD AND APPARATUS FOR DETERMINING WHETHER A COOLING DEVICE IN A COMPUTER SYSTEM IS RESPONSIVE TO CONTROL SIGNALS

(75) Inventors: Kalyanaraman Vaidyanathan, San Diego, CA (US); Kenny C. Gross, San Diego, CA (US); Aleksey M. Urmanov, San Diego, CA (US)

(73) Assignee: Oracle America, Inc., Redwood Shores, CA (US)

( * ) Notice: Subject to any disclaimer, the term of this patent is extended or adjusted under 35 U.S.C. 154(b) by 180 days.

(21) Appl. No.: 12/031,369

(22) Filed: Feb. 14, 2008

(65) Prior Publication Data

US 2009/0206842 A1    Aug. 20, 2009

(51) Int. Cl.
*G01D 3/00* (2006.01)
*G06F 1/20* (2006.01)

(52) U.S. Cl.
CPC ...................................... *G06F 1/206* (2013.01)
USPC ................. 702/108; 702/33; 702/34; 702/57; 702/58; 702/59; 702/66; 702/69; 702/82; 702/182; 702/183; 324/537

(58) Field of Classification Search
USPC ........ 324/537; 702/33, 34, 57, 58, 59, 66, 69, 702/82, 108, 182, 183
See application file for complete search history.

(56) References Cited

U.S. PATENT DOCUMENTS

| | | | | |
|---|---|---|---|---|
| 5,457,766 A * | 10/1995 | Ko | ................................. | 388/831 |
| 5,774,784 A * | 6/1998 | Ohno | ........................ | 455/343.2 |
| 5,834,856 A * | 11/1998 | Tavallaei et al. | ................ | 307/64 |
| 6,054,823 A * | 4/2000 | Collings et al. | .......... | 318/400.04 |
| 6,246,969 B1 * | 6/2001 | Sinclair et al. | ................ | 702/113 |
| 6,390,379 B1 * | 5/2002 | Huang | ........................ | 236/49.3 |
| 6,665,163 B2 * | 12/2003 | Yanagisawa | .................. | 361/103 |
| 6,935,130 B2 * | 8/2005 | Cheng et al. | ................. | 62/259.2 |
| 7,076,389 B1 * | 7/2006 | Gross et al. | ................... | 702/116 |
| 7,211,977 B2 * | 5/2007 | Squibb | ..................... | 318/400.08 |

* cited by examiner

*Primary Examiner* — Hyun Park
(74) *Attorney, Agent, or Firm* — Park, Vaughan, Fleming & Dowler LLP; A. Richard Park

(57) ABSTRACT

Some embodiments of the present invention provide a system that determines whether a cooling device in a computer system is responsive to control signals. During operation of the computer system, a control signal is sent to the cooling device. Next, a response of the computer system to the control signal is measured, wherein the response includes a temperature profile. The frequency content of the control signal is then compared to the frequency content of the temperature profile to determine whether the cooling device is responsive to the control signal.

28 Claims, 3 Drawing Sheets

METHOD AND APPARATUS FOR DETERMINING WHETHER A COOLING DEVICE IN A COMPUTER SYSTEM IS RESPONSIVE TO CONTROL SIGNALS

BACKGROUND

1. Field

The present invention relates to techniques for enhancing the performance of computer systems. More specifically the present invention relates to a method and apparatus for determining whether a cooling device in a computer system is responsive to control signals.

2. Related Art

During operation, computer systems typically generate heat and may need to be actively cooled. If a cooling device in a computer system fails, the operation of the computer system may be adversely impacted and the computer system may even eventually fail. Therefore, it is desirable to ensure that the cooling device in a computer system is functioning correctly.

In many computer systems, the cooling device is checked at regular intervals by temporarily turning it up from its equilibrium state and then sensing the impact of this change on the temperature of the computer system. In order to sense the increased cooling of the cooling device independently of the potentially varying load on the computer system, the cooling device may have to be turned up to or near its maximum cooling capability. The resulting temperature change, although observable to the sensors, may additionally cause thermal-gradient induced damage to components in the computer system.

Hence, what is needed is a method and apparatus for determining whether a cooling device in a computer system is responsive to control signals without the above-described problems.

SUMMARY

Some embodiments of the present invention provide a system that determines whether a cooling device in a computer system is responsive to control signals. During operation of the computer system, a control signal is sent to the cooling device. Next, a response of the computer system to the control signal is measured, wherein the response includes a temperature profile. The frequency content of the control signal is then compared to the frequency content of the temperature profile to determine whether the cooling device is responsive to the control signal.

In some embodiments, the cooling device includes a fan.

In some embodiments, sending the control signal to the cooling device includes sending a periodic signal to the fan to vary a speed of the fan.

In some embodiments, the cooling device includes a fan controller, and determining whether the cooling device is responsive to the control signal includes determining whether the fan controller is responsive to the control signal.

In some embodiments, the cooling device includes a fan speed sensor, and determining whether the cooling device is responsive to the control signal includes determining whether the fan speed sensor is responsive to the control signal.

In some embodiments, the cooling device includes a fan motor, and determining whether the cooling device is responsive to the control signal includes determining whether the fan motor is responsive to the control signal.

In some embodiments, the cooling device includes a temperature sensor, and determining whether the cooling device is responsive to the control signal includes determining whether the temperature sensor is responsive to the control signal.

In some embodiments, the cooling device includes a cooling device controller, and determining whether the cooling device is responsive to the control signal includes determining whether the cooling device controller is responsive to the control signal.

In some embodiments, determining whether the cooling device is responsive to the control signal includes continuously determining whether the cooling device is responsive to the control signal.

In some embodiments, comparing the frequency content of the control signal to the frequency content of the temperature profile includes using a Fast Fourier Transform.

In some embodiments, the control signal includes a predetermined frequency content.

In some embodiments, the control signal includes a periodic signal.

In some embodiments, sending the control signal to the cooling device involves systematically monitoring and recording a set of performance parameters of the computer system, wherein the recording process keeps track of the temporal relationships between events in different performance parameters.

DETAILED DESCRIPTION

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present description. Thus, the present description is not intended to be limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Figure 1:
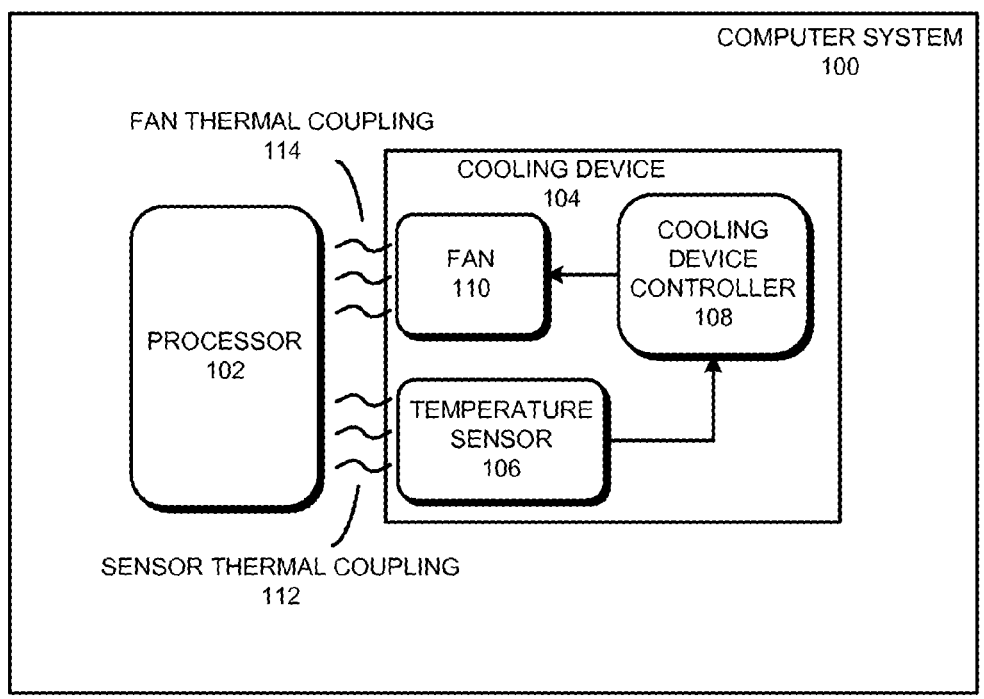
FIG. 1 represents a system for determining whether a cooling device in a computer system is responsive to control signals in accordance with some embodiments of the present invention.

FIG. 1 represents a system for determining whether a cooling device in a computer system is responsive to control signals in accordance with some embodiments of the present invention. Computer system 100 includes processor 102 and cooling device 104.

Cooling device 104 includes temperature sensor 106, cooling device controller 108 and fan 110. Temperature sensor 106 is thermally coupled by sensor thermal coupling 112 to processor 102 and fan 110 is thermally coupled by fan thermal coupling 114 to processor 102.

Processor 102 can generally include any type of processor, including, but not limited to, a microprocessor, a mainframe computer, a digital signal processor, a personal organizer, a device controller, a computational engine within an appliance, and any other processor now known or later developed. Furthermore, processor 102 can include one or more cores.

Note that although FIG. 1 illustrates computer system 100 with one processor, computer system 100 can include more than one processor. In a multi-processor configuration, the processors can be located on a single system board, or multiple system boards. Computer system 100 can include but is not limited to a server, server blade, a datacenter server, or an enterprise computer.

Temperature sensor 106 can include any type of temperature-sensitive sensor including but not limited to a discrete temperature-sensing device, or a temperature-sensing device integrated into processor 102 and may be mechanical, electrical, optical, or any combination thereof, and may be implemented in any technology now known or later developed.

Fan 110 can include any type of fan that can be used to cool processor 102 implemented in any technology now known or later developed. In some embodiments, fan 110 can be replaced by multiple fans or by any system that can provide cooling including but not limited to a thermoelectric cooler or any system that can draw heat from processor 102 implemented in any technology now known or later developed. In some embodiments, fan 110 includes a fan motor, a fan controller, and a fan speed sensor.

Cooling device controller 108 is coupled to temperature sensor 106 and fan 110. Cooling device controller 108 receives a temperature profile from temperature sensor 106 and sends a control signal to fan 110. Cooling device controller 108 compares a frequency content of the temperature profile to a frequency content of the control signal to determine whether the cooling device is responsive to the control signal.

Cooling device controller 108 can be implemented in any combination of hardware and software. In some embodiments cooling device controller 108 operates on processor 102. In other embodiments cooling device controller 108 operates on a service processor. In still other embodiments, cooling device controller 108 is located outside of computer system 100. In yet other embodiments, cooling device controller 108 operates on a separate computer system. Cooling device controller 108 can be any device that compares a frequency content of the temperature profile to a frequency content of the control signal to determine whether the cooling device is responsive to the control signal.

In some embodiments cooling device controller 108 includes a method or apparatus for monitoring and recording computer system performance parameters as set forth in U.S. Pat. No. 7,020,802 which is hereby fully incorporated by reference.

The frequency content of the temperature profile can be generated using any system or process to convert a signal in the time domain to a signal in the frequency domain including but not limited to any system or process implementing a Discrete Fourier Transform of any type including any Fast Fourier Transform, or any other digital or analog conversion, process, or technique and can include filtering such as a low-pass, band-pass, or high-pass filter implemented in hardware or software or any combination thereof.

In some embodiments, the cooling device can be thermally coupled to the entire computer system or a portion thereof including any system, subsystem, component, device, or other physical or logical segments within the computer system or any combination thereof. For example, in some embodiments, the cooling device can be thermally coupled to a power supply or memory chip in a computer system.

Figure 2:
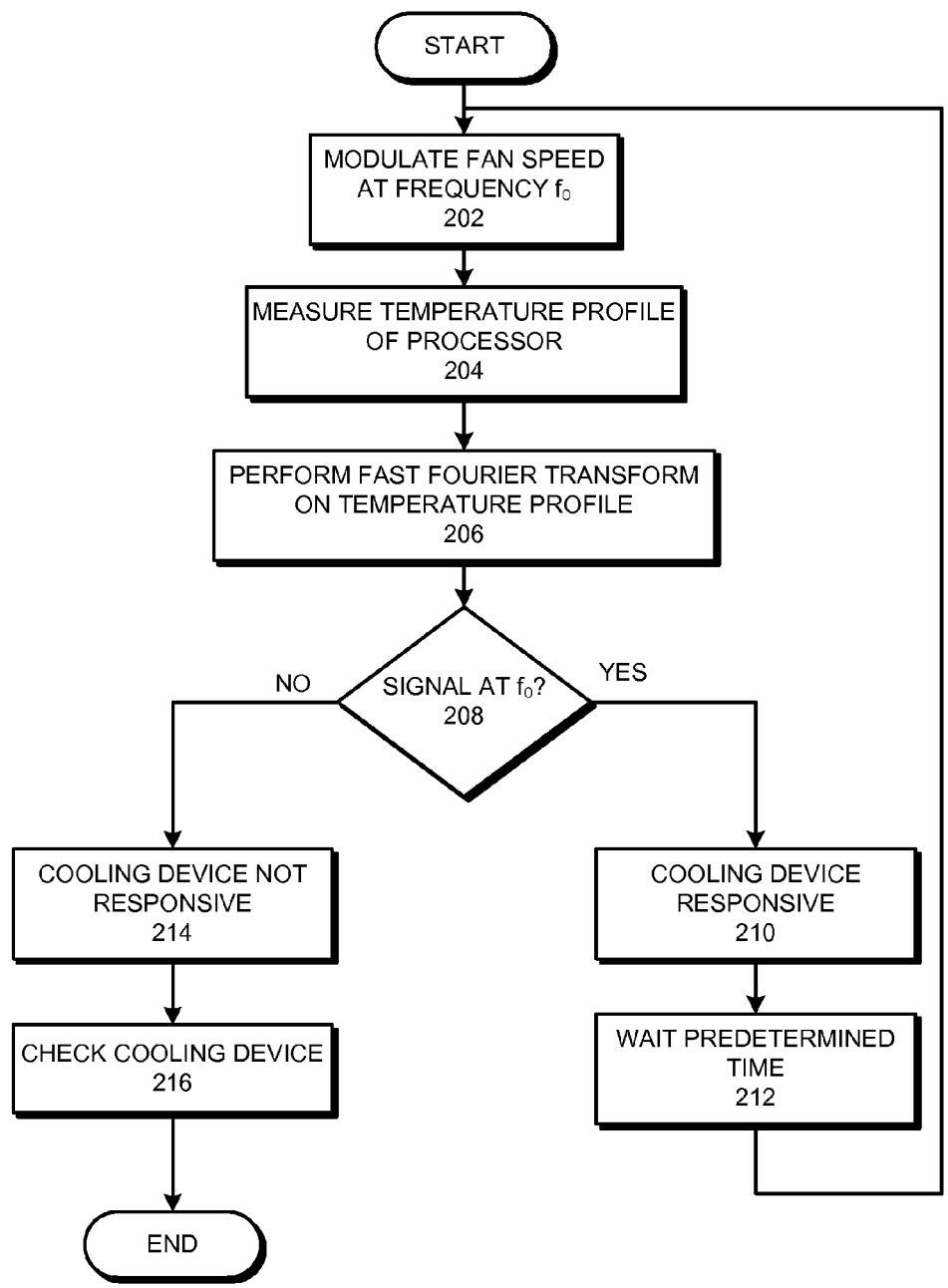
FIG. 2 presents a flow chart illustrating a process for determining whether a cooling device in a computer system is responsive to control signals in accordance with some embodiments of the present invention.

FIG. 2 presents a flow chart illustrating a process for determining whether a cooling device in a computer system is responsive to control signals in accordance with some embodiments of the present invention. First, a signal is sent to the fan to modulate the fan speed at a frequency $f_0$ (step 202). Next, the temperature sensor measures the temperature profile of the processor (step 204). A Fast Fourier Transform is then performed on the temperature profile (step 206).

If a signal at frequency $f_0$ is detected (step 208), the cooling device is determined to be responsive to the control signal (step 210). Then, after waiting a predetermined time (step 212) the process continues at step 202. In some embodiments, step 212 is eliminated and the process runs continuously with no predetermined delay.

If a signal at frequency $f_0$ is not detected (step 208), the cooling device is determined not to be responsive to the control signal (step 214). Next, a notification is sent to check the cooling device (step 216). In some embodiments step 216 can include a notification that any function or subsystem of the cooling device changed or may not be working, wherein the function or subsystem can include but is not limited to the fan, the fan motor, the fan speed sensor, the fan motor controller the temperature sensor, the device for performing the Fast Fourier Transform on the temperature profile, the cooling device controller, and the fact that that thermal contact between the cooling device and the processor has changed in any way.

Figure 3A:
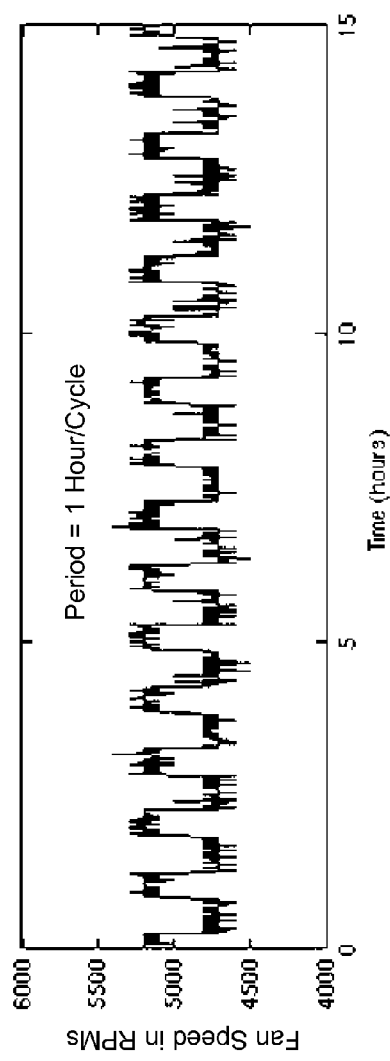
FIG. 3A illustrates a graph of a control signal including a periodic input to a cooling fan in accordance with some embodiments of the present invention.
Figure 3B:
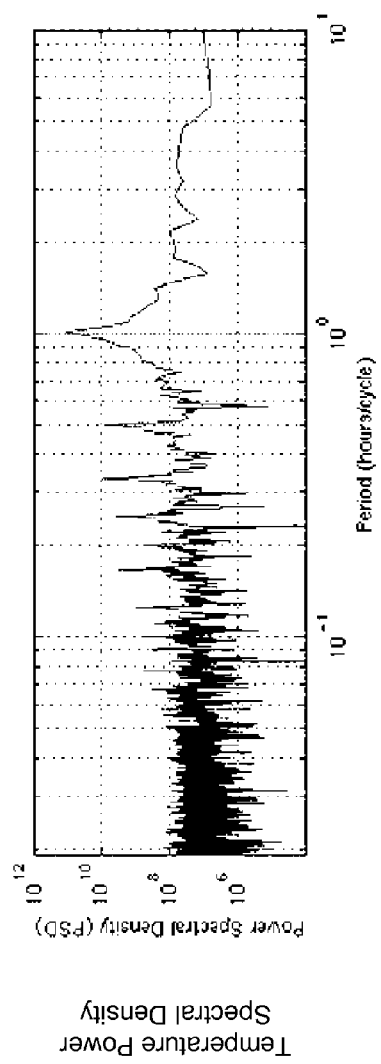
FIG. 3B illustrates a graph of the power spectral density of a temperature profile of a processor in response to the cooling fan input of FIG. 3A in accordance with some embodiments of the present invention.

FIG. 3A illustrates a graph of a control signal including a periodic input to a cooling fan in accordance with some embodiments of the present invention. FIG. 3B illustrates a graph of the power spectral density of a temperature profile of a processor in response to the cooling fan input of FIG. 3A in accordance with some embodiments of the present invention. It is noted that FIG. 3B demonstrates notable frequency content at the same frequency as the frequency content of the signal in FIG. 3A, which indicates that the cooling device is responsive to the control signals.

It is noted that the amplitude of the frequency content of the control signal can be chosen such that the resulting amplitude of the frequency content of the temperature profile has any desired level. In some embodiments, the amplitude of the frequency content of the control signal is chosen such that the resulting amplitude of the frequency content of the temperature profile has a sufficient signal to noise ratio to be detectable in a predetermined range of operating conditions for the processor. For example, a control signal may be chosen such that it causes a modulation of the fan speed such that when the processor is operating at its maximum load the resulting frequency content of the temperature profile is detectable at a predetermined signal to noise ratio.

In other embodiments, the amplitude of the frequency content of the control signal is chosen to achieve a predetermined balance between the signal to noise ratio in the frequency content of the temperature profile and detrimental thermal and thermal-gradient related effects on the computer system or portion thereof that is coupled to the cooling device. The detrimental thermal and thermal-gradient related effects can include but are not limited to: solder fatigue; interconnect fretting; differential thermal expansion between bonded materials; delamination failures; thermal mismatches between mating surfaces; differentials in the coefficients of thermal expansion between materials used in chip packages; wirebond shear and flexure fatigue; passivation cracking; electromigration failures; electrolytic corrosion; thermomigration failures; crack initiation and propagation; delamination between chip dies and molding compounds, as well as between the molding compound and the leadframe; die deadhesion fatigue; repeated stress reversals in brackets leading to dislocations, cracks, and eventual mechanical failures; deterioration of connectors through elastomeric stress relaxation in polymers; and any other factors that may adversely affect performance or reliability.

In some embodiments of the present invention, the fan is controlled by a control signal with any known frequency content. In these embodiments, the known frequency content of the control signal is compared to all or any portion of the frequency content of the temperature profile to determine whether the cooling device is responsive to the control signal. The fan can be modulated by any periodic signal, including but not limited to a sinusoidal signal, a square wave, triangle wave, or any approximations to these signals as allowed by the fan, fan controller, cooling device controller, or any other device, component or system used to generate or transmit the control signal.

For example, a square wave may be included in the control signal used to modulate the fan speed, but the response of the fan to the square wave may result in a fan speed that does not accurately reflect the frequency content of the square wave in the control signal. In these embodiments, the frequency content of the control signal can be compared to the frequency content of the temperature profile at the fundamental frequency of the square wave or any of its harmonic frequencies or any harmonic frequencies or frequency content that may be introduced due to the response of the fan to the control signal or any combination thereof.

In other embodiments of the invention, when the frequency content of the control signal is compared to the frequency content of the temperature profile to determine whether the cooling device is responsive to the control signal, factors that may be used include but are not limited to the relative strength of one or more portions of the frequency content of the control signal compared to that of one or more portions of the frequency content of the temperature profile, the variations of these signals or their relative strengths over time.

In some embodiments of the present invention, the fan speed is not modulated so that a baseline frequency content of the temperature profile can be measured. This baseline can be used to correct for any pre-existing frequency content in the temperature profile or to select a different modulation frequency or frequency content for the control signal.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for determining whether a cooling device in a computer system is responsive to control signals, comprising:
   sending a control signal to the cooling device to modulate an operation of the cooling device, wherein the control signal has a frequency content, and wherein modulating the operation of the cooling device comprises, when the cooling device is responsive to the control signal, using the cooling device to cause a temperature variation for the computer system based on the control signal;
   measuring a temperature profile of the computer system while modulating the operation of the cooling device;
   comparing the frequency content of the control signal to a frequency content of the temperature profile;
   determining that the cooling device is responsive to the control signal when the frequency content of the temperature profile includes one or more components of the frequency content to the control signal; and
   determining that the cooling device is not responsive to the control signal when the frequency content of the temperature profile does not include one or more components of the frequency content to the control signal.

2. The method of claim 1, wherein the cooling device includes a fan.

3. The method of claim 2, wherein sending the control signal to the cooling device includes sending a periodic signal to the fan to vary a speed of the fan.

4. The method of claim 2, wherein the cooling device includes a fan controller; and
   determining whether the cooling device is responsive to the control signal includes determining whether the fan controller is responsive to the control signal.

5. The method of claim 2, wherein the cooling device includes a fan speed sensor; and
   determining whether the cooling device is responsive to the control signal includes determining whether the fan speed sensor is responsive to the control signal.

6. The method of claim 2, wherein the cooling device includes a fan motor; and
   determining whether the cooling device is responsive to the control signal includes determining whether the fan motor is responsive to the control signal.

7. The method of claim 1, wherein the cooling device includes a temperature sensor; and
   determining whether the cooling device is responsive to the control signal includes determining whether the temperature sensor is responsive to the control signal.

8. The method of claim 1, wherein the cooling device includes a cooling device controller; and
   determining whether the cooling device is responsive to the control signal includes determining whether the cooling device controller is responsive to the control signal.

9. The method of claim 1, wherein determining whether the cooling device is responsive to the control signal includes continuously determining whether the cooling device is responsive to the control signal.

10. The method of claim 1, wherein comparing the frequency content of the control signal to the frequency content of the temperature profile includes using a Fast Fourier Transform.

11. The method of claim 1, wherein the control signal includes a predetermined frequency content.

12. The method of claim 11, wherein the control signal includes a periodic signal.

13. The method of claim 1, wherein sending the control signal to the cooling device involves systematically monitoring and recording a set of performance parameters of the computer system, wherein the recording process keeps track of the temporal relationships between events in different performance parameters.

14. The method of claim 1, wherein when the cooling device is responsive to the control signal, the temperature profile comprises a temperature profile corresponding to the temperature variation.

15. The method of claim 1, wherein the cooling device comprises a fan, and wherein the method further comprises:
    receiving the control signal at the fan; and
    causing variations for a speed of the fan by using the control signal.

16. The method of claim 1, wherein modulating the operation of the cooling device further comprises modulating the cooling device at a given frequency, and
    wherein determining that the cooling device is responsive to the control signal comprises determining that the temperature profile includes a signal at the given frequency.

17. A non-transitory computer-readable storage medium storing instructions that when executed by a computer cause the computer to perform a method for determining whether a cooling device in a computer system is responsive to control signals, the method comprising:
    sending a control signal to the cooling device to modulate an operation of the cooling device, wherein the control signal has a frequency content, and wherein modulating the operation of the cooling device comprises, when the cooling device is responsive to the control signal, using the cooling device to cause a temperature variation for the computer system based on the control signal;
    measuring a temperature profile of the computer system while modulating the operation of the cooling device;
    comparing the frequency content of the control signal to a frequency content of the temperature profile;
    determining that the cooling device is responsive to the control signal when the frequency content of the temperature profile includes one or more components of the frequency content to the control signal; and
    determining that the cooling device is not responsive to the control signal when the frequency content of the temperature profile does not include one or more components of the frequency content to the control signal.

18. The computer-readable storage medium of claim 17, wherein the cooling device includes a fan.

19. The computer-readable storage medium of claim 18, wherein sending the control signal to the cooling device includes sending a periodic signal to the fan to vary a speed of the fan.

20. The computer-readable storage medium of claim 18, wherein the cooling device includes a fan controller; and
    determining whether the cooling device is responsive to the control signal includes determining whether the fan controller is responsive to the control signal.

21. The computer-readable storage medium of claim 18, wherein the cooling device includes a fan speed sensor; and
    wherein determining whether the cooling device is responsive to the control signal includes determining whether the fan speed sensor is responsive to the control signal.

22. The computer-readable storage medium of claim 18, wherein the cooling device includes a fan motor; and
    wherein determining whether the cooling device is responsive to the control signal includes determining whether the fan motor is responsive to the control signal.

23. The computer-readable storage medium of claim 17,
    wherein the cooling device includes a temperature sensor; and
    wherein determining whether the cooling device is responsive to the control signal includes determining whether the temperature sensor is responsive to the control signal.

24. The computer-readable storage medium of claim 17,
    wherein the cooling device includes a cooling device controller; and
    wherein determining whether the cooling device is responsive to the control signal includes determining whether the cooling device controller is responsive to the control signal.

25. The computer-readable storage medium of claim 17, wherein the control signal includes a predetermined frequency content.

26. The computer-readable storage medium of claim 17, wherein sending the control signal to the cooling device involves systematically monitoring and recording a set of performance parameters of the computer system, wherein the recording process keeps track of the temporal relationships between events in different performance parameters.

27. An apparatus for determining whether a cooling device in a computer system is responsive to control signals, comprising:
    a sending mechanism configured to send a control signal to the cooling device to modulate an operation of the cooling device, wherein the control signal has a frequency content, and wherein modulating the operation of the cooling device comprises, when the cooling device is responsive to the control signal, using the cooling device to cause a temperature variation for the computer system based on the control signal;
    a measuring mechanism configured to measuring a temperature profile of the computer system while modulating the operation of the cooling device;
    a comparing mechanism configured to compare the frequency content of the control signal to a frequency content of the temperature profile;
    wherein the comparing mechanism is further configured to determine that the cooling device is responsive to the control signal when the frequency content of the temperature profile includes one or more components of the frequency content to the control signal and to determine that the cooling device is not responsive to the control signal when the frequency content of the temperature profile does not include one or more components of the frequency content to the control signal.

28. The apparatus of claim 27, wherein the sending mechanism is configured to systematically monitor and record a set of performance parameters of the computer system, wherein the recording process keeps track of the temporal relationships between events in different performance parameters.

* * * * *

UNITED STATES PATENT AND TRADEMARK OFFICE
CERTIFICATE OF CORRECTION

| | |
|---|---|
| PATENT NO. | : 8,886,485 B2 |
| APPLICATION NO. | : 12/031369 |
| DATED | : November 11, 2014 |
| INVENTOR(S) | : Vaidyanathan et al. |

Page 1 of 1

It is certified that error appears in the above-identified patent and that said Letters Patent is hereby corrected as shown below:

In the Specification

In column 4, line 42, delete "that that" and insert -- that --, therefor.

Signed and Sealed this
Twenty-third Day of June, 2015

Michelle K. Lee
*Director of the United States Patent and Trademark Office*